Dec. 29, 1964  J. P. TREEN  3,163,049
MOTION CONVERTING MEANS
Filed May 31, 1962

INVENTOR.
JOHN PIKE TREEN

BY *Cullen, Sloman & Cantor*

ATTORNEYS

United States Patent Office 3,163,049
Patented Dec. 29, 1964

3,163,049
MOTION CONVERTING MEANS
John Pike Treen, Sunwood Farm, Adversane, near Billingshurst, Sussex, England
Filed May 31, 1962, Ser. No. 199,085
Claims priority, application Great Britain, June 12, 1961, 21,189/61
4 Claims. (Cl. 74—50)

This invention relates to mechanisms for converting reciprocating motion into rotary motion and vice versa and is applicable to reciprocating piston engines, compressors, pumps or the like.

In conventional mechanisms for converting reciprocating motion into rotary motion and vice versa a reciprocating member, for example a piston reciprocable within a cylinder, is articulated at a central part thereof with one end of a connecting rod, the other end of which is articulated with a crank throw rotatable about an axis lying laterally of and intersecting the axis of reciprocation of the member or piston. Such an arrangement requires that the member or piston be made massive in order to provide a suitable joint for the connecting rod. Thus, in conventional mechanisms a massive piston performs a purely reciprocating motion and furthermore a large part of the connecting rod can also be considered as performing a substantially reciprocating motion.

As is well known by those skilled in the art a reciprocating piston comes to a momentary standstill at each end of its stroke and inertia stresses are set up therein which are proportional to the mass of the reciprocating parts and which upsets dynamic balance within the mechanism. Another problem with such a mechanism is that due to the motion of the connecting rod couples are set up between the piston and the cylinder causing uneven wear or "barrelling" of the latter and difficulties of providing lubrication for the rubbing surfaces.

In order to overcome these disadvantages the present invention provides novel means for converting reciprocating motion into rotary motion and vice versa.

In order that the invention may be clearly understood some typical forms of mechanisms according to the present invention, and applications thereof, will now be described, by way of example with reference to the accompanying diagrammatic drawing, in which.

Figure 1:
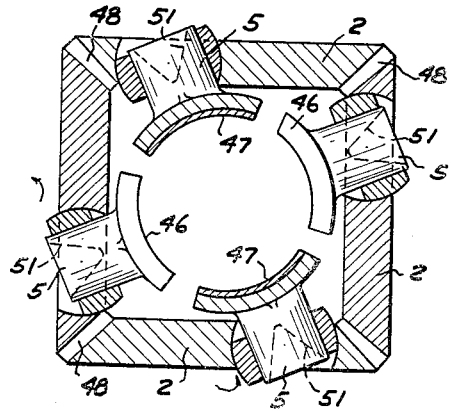
FIG. 1 is a sectional plan view of an assembly in accordance with the present invention.
Figure 2:
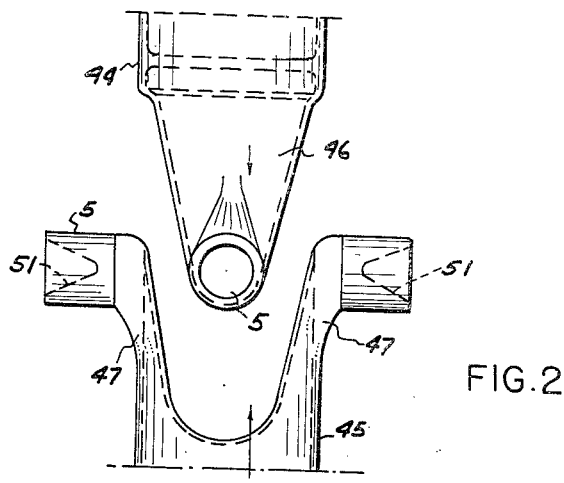
FIG. 2 is a side elevation of piston constructions suitable for use with the construction illustrated in FIG. 1.

In FIGS. 1 and 2, opposed and separate pistons 44 and 45 are used that move towards and away from each other during operation. The two piston members are identical, each piston being provided with two diametrically opposed legs these being indicated by the reference numeral 46 in the case of the piston 44 and by the reference numeral 47 in the case of the piston 45. Each leg carries a trunnion beam 5 at its remote end extending radially outwards with respect to the axis of reciprocation of the pistons 44, 45. The two pistons are so oriented, with respect to their axis of reciprocation, that the trunnion beams 5 carried by the legs 46 on piston 44 lie on a common axis that is disposed at 90° to the common axis of the trunnion beams carried by the legs 47 on the piston 45. The legs of two pistons are, moreover, so shaped as to nest, one pair within the other pair, when both pistons are at bottom dead centre. Thus the two pairs of trunnion beams are continually passing each other and at the instant of mid-stroke their axes lie in a common plane normal to the axis of reciprocation of the two pistons.

The 90° setting between the two piston members is maintained at all times and the two trunnion beams of each piston are connected to opposing pairs of crank wheels 2, FIG. 1, with each trunnion beam being slidable with respect to and universally articulated with its associated crank wheel, the rotation of the four crank wheels 2 being so phased that the two pistons 44, 45 mutually recede and approach and reach top dead centre simultaneously.

Since, with this arrangement, the crank wheels carried by the arms 46 rotate in one direction and the crank wheels carried by the arms 47 rotate in the opposite direction, the four crank wheels 2 may be geared together by means of meshing bevelled teeth 48 thereon.

The embodiment illustrated diagrammatically in FIGS. 1 and 2 is particularly applicable to two stroke cycle engines since the changing volume between the two pistons 44, 45 could be utilized to provide crankcase inspiration and compression.

Figure 3:
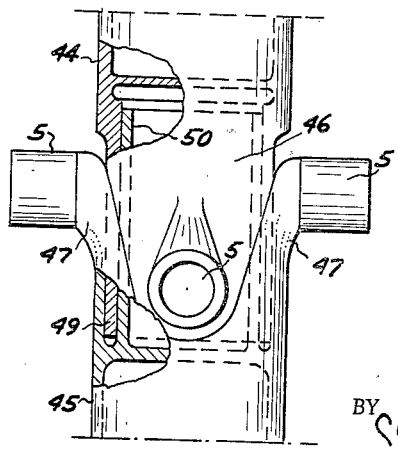
FIG. 3 is a side elevation partly in section of a modified construction of the arrangement shown in FIG. 2.

A modified construction of FIGS. 1 and 2 is illustrated in FIG. 3 in which the two pistons 44, 45 have, in addition to the legs 46, 47, tubular sleeves 49, 50. As shown the tubular sleeve 50 carried by the piston 45 is a sliding fit within the sleeve 49 carried by the piston 44. The usual piston rings or other sealing means may be included between the sleeves 49, 50. This construction is useful for high speed two-stroke engines in which a high compression ratio cannot be obtained with the comparatively large volume of crank case necessary to accommodate the crank wheels, etc., since the volume enclosed by the two sleeves 49, 50 can be used to provide the necessary compression. Ports as necessary (not shown) are cut in the two sliding sleeves to mate with suitable control ports in adjacent outer walls.

The trunion beams 5 may be formed with conically shaped hollows 51 or any other suitably shaped cavity in order to reduce weight.

"Barrelling" of the cylinders after sustained use, which is a disadvantage of conventional engines using connecting-rods, is substantially eliminated by the mechanisms described. Furthermore, since the connections between the crank throw discs and the pistons do not involve structure within a piston the mass thereof can be considerably reduced by making same hollow and thus concentrating the weight of the pistons and trunnions in the regions of the spherical bushes which rotate about their respective disc axes. This has the advantage over conventional engines of reduction of inertia loading at top and bottom dead centre even when a piston performs purely reciprocating movement but particularly when a piston also oscillates about its axis of reciprocation. The mechanisms described also have a higher power-to-weight ratio than conventional engines and are compact.

Although, in the above examples it is assumed that the piston or pistons is or are driving the crank wheels it will be appreciated that the crank wheels may also be used to drive the piston as in a pump.

It will be understood that the invention is not restricted to the precise constructions described by way of example with reference to the accompanying drawing and that the invention is only limited so far as it falls within the scope of the appended claims.

What I claim is:

1. Means for converting reciprocating motion into rotary motion and vice versa, said means comprising two reciprocating piston members moving towards and away from each other during operation, each reciprocating piston member having two axially extending legs spaced diametrically apart with respect to the axis of the reciprocating piston member and such that when the two reciprocating piston members move together, to a bottom dead center position, the legs on one reciprocating piston member nest within the legs of the other reciprocating piston member, each leg carrying a trunnion beam that extends radially outwards with respect to the axis of reciprocation of the piston members, a crank throw for each trunnion beam, each crank throw being rotatable about an axis normal to the axis of reciprocation of the two piston members, and each trunnion beam being slidable with respect to and universally articulated with its associated crank throw so that as the two piston members move towards and away from each other they cause the four crank throws to rotate about said axes normal to the axis of reciprocation of the two piston members, the two piston members being oscillatable about their axis of reciprocation.

2. Means as defined in claim 1 and wherein the two reciprocating piston members each carry a tubular sleeve, the sleeve of one piston member sliding within the sleeve on the other piston member.

3. Means as defined in claim 1 and wherein the two reciprocating piston members each carry a tubular sleeve, the sleeve of one piston member sliding within the sleeve on the other piston member, the sliding sleeves being formed with ports such that, during operation the changing volume created by the sleeves sliding one within the other can be used to provide the equivalent of crankcase inspiration.

4. Means defined in claim 1 in which the crank throws have a peripheral surface supported for rotational movement by bearings.

References Cited in the file of this patent

UNITED STATES PATENTS

| | | |
|---|---|---|
| 570,871 | Dauthett | Nov. 3, 1896 |
| 848,635 | Comstock | Apr. 2, 1907 |
| 1,508,937 | Pocock et al. | Sept. 16, 1924 |
| 2,392,052 | Matheisel | Jan. 1, 1945 |
| 2,442,482 | Bancroft | June 1, 1948 |
| 2,455,626 | Traut | Dec. 7, 1948 |
| 2,480,854 | Hardman | Sept. 6, 1949 |
| 2,514,264 | Soper | July 4, 1950 |
| 2,698,394 | Brown | Dec. 28, 1954 |

FOREIGN PATENTS

| | | |
|---|---|---|
| 647,008 | Great Britain | Dec. 6, 1950 |